US008788695B2

(12) United States Patent
Fox et al.

(10) Patent No.: US 8,788,695 B2
(45) Date of Patent: Jul. 22, 2014

(54) METHOD AND APPARATUS FOR SESSION BANDWIDTH ESTIMATION AND RATE CONTROL

(75) Inventors: Michael Fox, San Diego, CA (US); Faisal Mushtaq, San Jose, CA (US); Ashwani Arya, La Jolla, CA (US); Ron Garrison, San Diego, CA (US)

(73) Assignee: Allot Communications Ltd., Hod-Hasharon (IL)

( * ) Notice: Subject to any disclaimer, the term of this patent is extended or adjusted under 35 U.S.C. 154(b) by 86 days.

(21) Appl. No.: 13/525,069

(22) Filed: Jun. 15, 2012

(65) Prior Publication Data

US 2012/0324123 A1    Dec. 20, 2012

Related U.S. Application Data

(60) Provisional application No. 61/497,458, filed on Jun. 15, 2012.

(51) Int. Cl.
    *G06F 15/16*    (2006.01)
    *G06F 15/78*    (2006.01)
(52) U.S. Cl.
    CPC ................................. *G06F 15/781* (2013.01)
    USPC ........................... 709/231; 709/236; 709/232
(58) Field of Classification Search
    USPC ....................................................... 709/231
    See application file for complete search history.

(56) References Cited

U.S. PATENT DOCUMENTS

| | | | |
|---|---|---|---|
| 7,558,202 B2 | 7/2009 | Luo et al. | |
| 7,751,439 B2* | 7/2010 | El Kolli et al. | 370/468 |
| 7,925,775 B2 | 4/2011 | Nishida | |
| 2005/0091696 A1 | 4/2005 | Wolfe et al. | |
| 2009/0300203 A1* | 12/2009 | Virdi et al. | 709/231 |
| 2009/0313330 A1 | 12/2009 | Sakamoto | |
| 2010/0020823 A1 | 1/2010 | Bai et al. | |
| 2010/0195602 A1 | 8/2010 | Kovvali et al. | |
| 2010/0333148 A1* | 12/2010 | Musha et al. | 725/81 |
| 2011/0296046 A1* | 12/2011 | Arya et al. | 709/231 |

OTHER PUBLICATIONS

International Search Report for PCT/US12/042810 dated Dec. 3, 2012.
International Search Report for PCT/US12/042811 dated Feb. 20, 2013.

* cited by examiner

*Primary Examiner* — Kevin Bates
*Assistant Examiner* — Emad Siddiqi
(74) *Attorney, Agent, or Firm* — Eitan, Mehulal & Sadot

(57) ABSTRACT

An intermediate device receives a content data message addressed to a receiving device for a communication session between a source device and the receiving device. The intermediate device substitutes adapted content data for content data of the content data message and then sends the adapted content data to the receiving device such that it appears to the receiving device that the adapted content data originated from the source device. The communication from the source device to the receiving device is intercepted by the intermediate device in a manner that is transparent to the source device and receiving device.

12 Claims, 7 Drawing Sheets

METHOD AND APPARATUS FOR SESSION BANDWIDTH ESTIMATION AND RATE CONTROL

CROSS-REFERENCE TO RELATED APPLICATIONS

This application claims the benefit of priority of U.S. Provisional Patent Application Ser. No. 61/497,458 entitled "Method And Apparatus For Session Bandwidth Estimation And Rate Control" to Michael Fox, Faisal Mushtaq, Ashwani Arya, Ronald Garrison filed Jun. 15, 2011. Priority of the filing date of Jun. 15, 2011 is hereby claimed, and the disclosure of the Provisional patent application is hereby incorporated by reference.

BACKGROUND

1. Field of the Invention

The present invention relates to data communications and, more particularly, to managing download of progressive data for video and/or audio streams.

2. Description of the Related Art

Video streaming over communication networks has become more and more popular. In network video streaming, a client machine (such as a desktop or laptop computer or a Web-enabled mobile phone) receives a video stream from a video source over a network connection. The video stream generally includes video format data comprising graphic or image data as well as audio data. The video stream may comprise a video clip having content of a predetermined length, such as a movie or presentation, or the video stream may comprise an ongoing video feed of undetermined length, such as output from a Web cam or some other live signal feed. Several communication protocols have been developed and are standardized to enable streaming video transfer between video source and client machine, for example, protocols such as RTSP, RTMP, HTTP progressive download, MMS, and custom protocols. Among these, progressive download streaming of videos has become very popular.

In HTTP progressive download, reproduction or playback of the video data stream begins after an initial file download using the HTTP protocol is received at the client end. The initial file comprises a portion of the video stream, and is followed by download of subsequent file content corresponding to subsequent portions of the video stream. As the file content is downloaded, the video playback proceeds after receiving a few seconds worth of video data from the video stream, without waiting until the entire video stream has been received. The subsequent file content comprising the remaining video is downloaded, decoded, and rendered for playback. There has been tremendous demand for video viewing on the Internet and that viewing demand has in turn increased demands on wireless network resources due to ubiquitous coverage and mobile users consuming video everywhere service is available. Consequently the popularity of video streaming causes overloading of bandwidth-limited networks, especially radio frequency (RF) wireless networks such as, for example, cellular data networks, WiFi networks, satellite networks, and the like.

The underlying Internet network protocol used for video progressive streaming is Transmission Control Protocol (TCP) or User Datagram Protocol (UDP). In recent years, the network transfer protocol used for delivery of Internet traffic over all types of networks, including RF wireless networks, is TCP, which is used in conjunction with the Internet Protocol (IP) and is often jointly referred to as TCP/IP. TCP provides reliable, ordered, error-free delivery of a stream of bytes from a program on one computer to a program on another computer. The bytes being transferred are typically organized into packets that are routed over the network using the IP protocol. The TCP protocol has mechanisms for packet flow control, retransmission in case of packet loss, segment size, network congestion avoidance, and session control, e.g., establishment and termination.

Due to factors such as network congestion, traffic load balancing, switch memory overflow, physical link layer loss, or other unpredictable network behavior, IP packets can be lost, or delivered out of order at the receiving client. These add to processing operations at the client and can result in choppy video on playback. The receiving TCP stack detects data packet loss and/or delay problems, requests retransmission of lost packets, and rearranges out-of-order packets into the proper packet order for display. The sending TCP stack also tries to reduce network congestion, to reduce the occurrence of the other problems mentioned above, by packet flow control. Packets comprise collections of bytes of data in a contiguous PDU or Protocol Data Unit. For TCP/IP, the PDU is defined as a TCP segment this determines the maximum number of bytes in a PDU transported over the network. Once the receiving TCP Stack, which is part of the machine's operating system kernel, has reassembled a perfect copy of the stream of data packets originally transmitted it passes that stream data to the application program of the client machine for playback.

TCP is optimized for accurate delivery rather than for timely delivery, and therefore, TCP processing sometimes incurs relatively long delays (on the order of hundreds of milliseconds) while waiting for proper sequencing of out-of-order segments or retransmission of lost segments. Delays in the reception of packets can cause underflow of the video player at the client, resulting in stalled or choppy playback.

Wireless network links are known to experience sporadic and usually temporary packet losses due to communication artifacts such as fading, shadowing, hand-off, and other radio effects, as well as network congestion. The sending TCP will react to such losses with network back-off operations utilizing a congestion window. After the back-off of the congestion window size, TCP can enter a congestion avoidance phase with a conservative decrease in window size. This congestion avoidance phase results in reduced throughput. Because of the sporadic nature of TCP throughput in wireless networks, consistent delivery of video content requires the adaption of the content rate to the effective network rate for stall free playback.

Progressive download results in an aggressive (i.e., as fast as possible) download of video from the HTTP server over the network. This is another source of network inefficiency in the case of a user selecting a video for download, watching a short portion of the video, and then stopping the video. Since the progressive download transmits the video stream as quickly as possible, unviewed content may be transmitted over the network and accumulated at the client machine, only to be discarded if the user at the client device stops watching the video. This wastes valuable network bandwidth and resources.

HTTP Progressive download using TCP is the predominant use case over the Internet because of pervasive support of this video delivery through computer players such as the Adobe FLASH™ player, Microsoft SILVERLIGHT™ player, and Apple QUICKTIME™ player, and through other playback devices. When transporting video or other streamed data over a network, TCP merely uses as much of the network's bandwidth as the TCP protocol allows. If the network has a bandwidth that is higher than the rate at which TCP is sending the data, no indication of available network bandwidth can be obtained using TCP.

Improved methods of estimating the bandwidth available over wired and/or wireless networks allow a variable rate download system to more effectively manage download of the content streams.

SUMMARY

A bandwidth estimation technique is used to estimate the bandwidth available from a midpoint in a network to a client device. In typical content streaming protocols, such as TCP, for example, a progressive download is used where all of the data is downloaded as fast as the channel can transmit. In contrast, download methods disclosed herein control the amount of data downloaded to maintain data comprising a certain display time of data in a client buffer, and the data is written in a way such that the bandwidth to the client can be estimated without feedback from the client device. Content data is grouped into large pulses or chunks and is downloaded quickly in order to measure the channel bandwidth. When the pulse takes too long to transmit, the system compresses or re-encodes the video at a lower data rate and transmits more frames into a block of a given size. Download techniques described herein measure network bandwidth by determining how long it takes to transmit a block of data of a predetermined size using an inelastic fixed output buffer and subsequently pacing the delivery of a content stream based on the determined bandwidth.

Other features and advantages of the present invention will be apparent from the following description of the embodiments, which illustrate, by way of example, the principles of the invention.

Additional details are provided by the attached appendices, which are incorporated herein.

DETAILED DESCRIPTION

Figure 1:
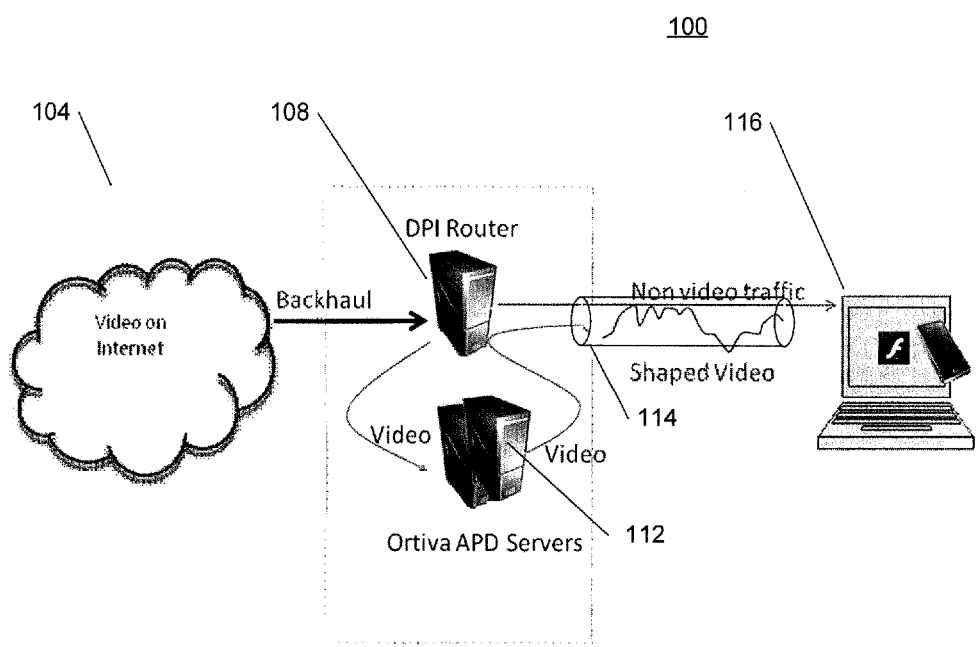
FIG. 1 is a high level functional block diagram of a system for managing download of streaming data.

TCP (Transmission Control Protocol) is the most widely used transport layer protocol used for various Internet applications. Methods described herein provide a scheme to effectively estimate the end-to-end bandwidth of a TCP session without requiring any explicit feedback from a client who is receiving content associated with the TCP session. The session bandwidth estimate can then be used to provide effective rate control for high throughput applications such as video streaming and the like. The rate of content being sent can be paced dynamically to control the amount of data in a client buffer while sending data in a way that bandwidth to the client can be estimated. Maintaining a desired amount of data in the client buffer without over trans-rating the data or sending too much data can be difficult to achieve. Methods and systems described herein are used to dynamically make the video pacing decisions at the same time that the bandwidth to the client is being estimated. The systems and methods described herein can be used with protocols other than TCP, such as the Real-Time Transport Control Protocol (RTCP). TCP is used to facilitate the description only as an example.

Methods and apparatus for bandwidth estimation and rate control during a session provide a means to improve TCP network bandwidth allocation for greater efficiency and can be used for content playback in networks with variable bandwidth such as, for example, wireless networks. Depending on the nature of encapsulation of the content, content can be adapted in various ways to accommodate the estimated network bandwidth. For content encapsulated in a non-secure, digital rights management (DRM) free encoding (e.g., YouTube Flash content or segmented MP4), the session bandwidth estimate can be used to adapt the content as necessary to a lower bandwidth encoding as the content passes through a rate adaption element. Thus the content is delivered to the client at a bandwidth below the channel capacity for the client, and playback is smooth without stalls. For content encapsulated in a secure format that cannot be decoded by a content adaption element, the content data rate can be paced relative to the measured network bandwidth. This provides improved network load sharing and a more consistent network performance by pacing the content delivery rate safely below the variance of the effective network rate. By pacing below the network variance, the client receives consistent video quality without stalling due to channel variability.

The bandwidth estimation scheme is used to characterize the channel by way of identifying choke points. Various impairments can cause a choke point. Packets being dropped for various reasons is the most common cause of a drop in bandwidth. The TCP protocol retransmits dropped packets. The bandwidth estimation scheme employs transmission of data pulses or blocks, and measurement of the network transmission time to estimate throughput of a TCP session. The data to be transmitted is collected together and sent as data pulses. The TCP transmission time is then measured for each data pulse and the bandwidth is measured as follows:

Session Bandwidth=(Data bytes sent)/(TCP transmission time)    (1)

A server employing the bandwidth estimation scheme described herein causes a user space process to write the pulse of content data to a limited size transmit (TX) buffer using, for example, an ASYNC operation. User space ASYNC writes require no special TCP kernel patches, and work with all congestion control algorithms. A limited size TX buffer is set with a socket option that blocks the writing thread until the TX buffer contains the write data. The TX buffer is modeled as a leaky bucket. With proper bucket sizing, the time to fill and empty the bucket can be used to determine the TCP Session bandwidth. The time duration for the blocked write thread is used to measure transmission time needed for the content block or pulse. Successive pulse transmissions result in successive bandwidth measurements which are utilized to improve the estimate of the available network bandwidth. Filtering (averaging) of the network bandwidth estimates improves the estimate accuracy. The content block or pulse can be adaptively sized for resolution of session bandwidth estimates. Lower network bandwidth conditions call for smaller pulses (less data) than high bandwidth network conditions.

A high level functional block diagram of a system 100 for managing progressive download of temporally ordered streaming data is illustrated in FIG. 1. In the illustrated system 100, a network 104 acts as a conduit of digital data, or backhaul, to a router 108 that receives the digital data. The network 104 could be a network such as the Internet, or could be a backhaul network for a cellular network, a satellite network, or other wireless network. The digital data received by the router 108 includes multiple types of data, including temporally-ordered content streams (referred to herein as content streams) such as video, audio, and combined audio/video. In this illustrated embodiment, the content streams are transported using an HTTP-based progressive download (PD) mechanism such as those used by FLASH™ by Adobe Systems Incorporated of San Jose, Calif., USA, or SILVERLIGHT™ by Microsoft Corporation of Redmond, Wash., USA, and the like.

The router 108, in this embodiment, is referred to as a Deep Packet Inspection (DPI) router. The DPI router 108 intercepts the digital traffic received from the network 104 and filters out the content streams from other types of traffic. All the content stream traffic and the other digital traffic, including, for example, HTML, JPEG, Binary Streams, and the like, is transferred over the network using the HTTP protocol. The DPI router 108 typically identifies and discerns the content streams from the other digital traffic based on MIME-type. The non-content stream traffic is forwarded from the DPI router 108 over a subnetwork 114 to user equipment 116. The user equipment 116 in this embodiment comprises a client machine, and could be a device such as a laptop computer, personal computer (PC), set-top box, netbook, cellular phone, smart phone, mobile Internet device (MID), and the like. The subnetwork 114 may include one or more wireless or wireline networks.

The DPI router 108 redirects the content stream traffic to one or more adaptive progressive download (APD) servers 112. The system 100 of FIG. 1 shows two APD servers 112, but systems may include more or fewer APD servers 112. For example, multiple APD servers 112 may be used to perform load balancing between them and to provide redundancy.

The APD servers 112 manage transfer and possible modification of the content streams over the subnetwork 114. Details of functions performed by the APD servers 112 are described, for example, in U.S. patent application Ser. No. 12/790,728, titled "ADAPTIVE PROGRESSIVE DOWNLOAD" and filed on May 28, 2010, assigned to the assignee of the present invention. Much of the traffic making up the content stream traffic is Internet video and is displayed on client devices using mechanisms such as Adobe FLASH™ or Microsoft SILVERLIGHT™ technology. Both of these technologies support several video codecs including well-known codecs such as H.264, VC-1, On2, and VP6. For audio signals, these technologies are capable of supporting audio codecs such as AAC, AAC++, mp3, ADPCM, Windows Media Audio, and the like.

Content streams using Adobe FLASH™, MP4, or Microsoft SILVERLIGHT™ technologies utilize compressed data for both audio and video. The compressed audio and video data are encapsulated in file container formats such as those commonly known as Adobe Flash Video "FLV", mp4, or Windows Media Video "WMV" file formats. These file container formats provide time-stamps for rendering of audio and video data, and provide separate bins/packets to describe audio, video, or text packets.

In a typical delivery, FLV or WMV files are hosted on a web-server. Web browser plug-ins such as for FLASH™, SILVERLIGHT™, or WINDOWS MEDIA PLAYER™ are hosted in a Web browser at a client machine, and are provided with the relevant URL(s) of the content stream(s) embedded in Web pages as they are browsed by the end-users at the client machine. The hosting Web server also sets the appropriate MIME-type as video/x-flv or video/x-ms-wmv (see, e.g., the Web page at http://support.microsoft.com/kb/288102). In this way, a receiving browser knows to load the appropriate plugin to render the data which is delivered on the HTTP protocol.

Content streams directed at video players are typically transported over HTTP using TCP transport techniques. In addition, content streams that are transported over networks using HTTP progressive download typically use all the bandwidth available on the network without regard to whether or not the end user needs or wants all the content stream data as quickly as possible. The APD servers 112 estimate network conditions, estimate the temporal amount of content stored in a client's buffer, and manage transport of the content streams being transported over the subnetwork 114 using TCP.

Figure 2:
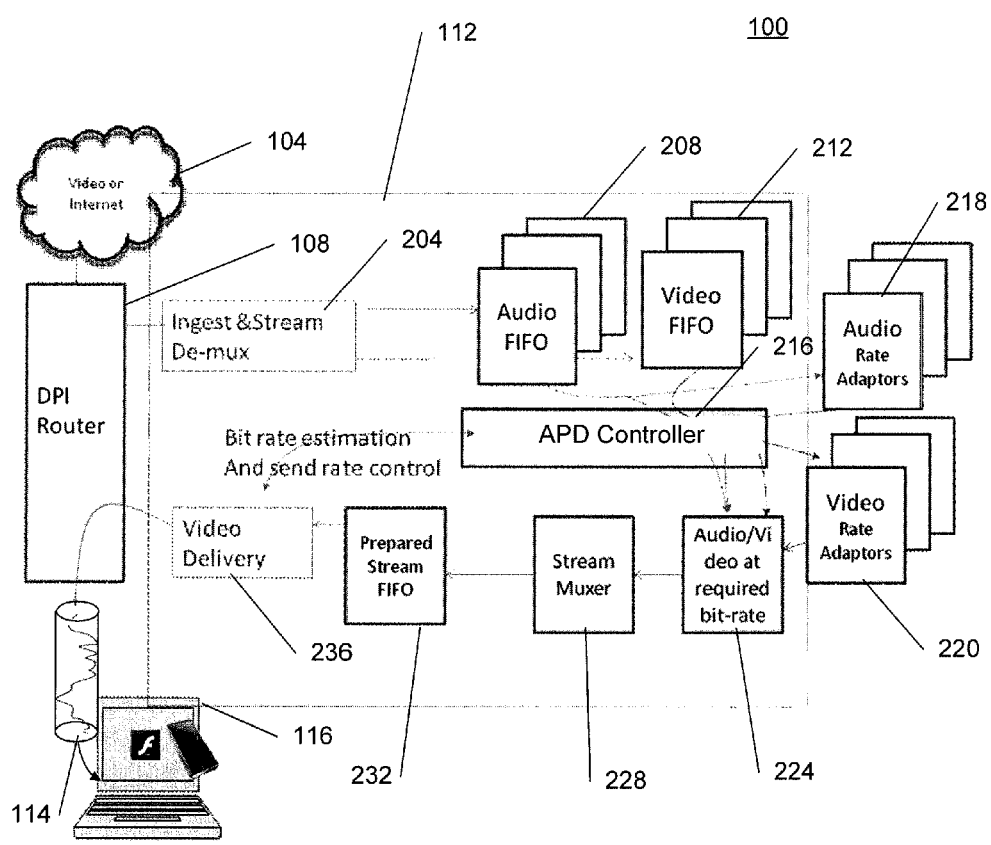
FIG. 2 is a functional block diagram of the system of FIG. 1 illustrating subsystems of an adaptive progressive download (APD) server employed in the system.

FIG. 2 is a more detailed functional block diagram of the FIG. 1 system 100. In particular, FIG. 2 shows various subsystems of the APD server 112, including a content stream ingest and de-multiplexer (de-mux) subsystem 204, input audio first-in-first-out (FIFO) buffers 208, input video FIFO buffers 212, an APD controller 216, a multiplexer queue 224, a content stream multiplexer 228, a content stream output FIFO buffer 232, and a delivery interface 236.

The ingest/de-mux subsystem 204 receives content data streams that have been intercepted by the DPI router 108. The multiple content streams can be in one of a plurality of container formats such as Adobe FLV or Microsoft WMV. The ingest/de-mux subsystem 204 splits the individual content streams into audio and video substreams. The individual audio substreams are stored in corresponding buffers of the audio FIFO buffer 208. The audio substreams can be transcoded or re-encoded for bit rate reduction in some embodiments. The sampling rate of audio is determined at the beginning of content stream processing and is kept fixed for the duration of the content stream. However, the bits assigned per packet due to quantization can be changed.

The ingest/de-mux subsystem 204 splits the individual video substreams into epochs. In the illustrated system, the epochs are of about five seconds in length. An epoch length of about five seconds is a reasonable compromise that allows a sufficiently large piece of video to be sent to the client to have a reasonable impact on the amount of video stored in the client buffers, while at the same time not putting the APD server 112 into a situation where the adapted bitrates would be changed too frequently. The individual video epochs are stored in corresponding buffers of the video FIFO buffer 212.

While splitting the video of the content stream into epochs, the ingest/de-mux subsystem 204 looks for an intra-coded frame, or I-frame (also referred to as an IDR_FRAME in H.264 codecs), which is at the beginning of a GOP beginning boundary which will be the start of the next epoch. Those skilled in the art will understand that a "GOP" refers to a group of pictures comprising a collection of consecutive frames of video. The frames within a GOP typically comprise either I-frames, P-frames, or B-frames. According to the MPEG standard, as noted above, a GOP ordinarily begins with an I-frame. Video frames at a GOP boundary are not typically dependent on reference frames of a previous GOP. In this way, each epoch can be decoded independently of other epochs. That is, each epoch can be manipulated independently of the other epochs for transfer over the network. I-Frames are typically encoded every 30 to 60 frames but could occur less frequently. Hence, the epochs are nominally about five seconds of viewing time and are typically under seven seconds.

The APD controller 216 determines the rate at which to send the multiplexed stream (e.g., video and audio epochs) to the user equipment 116. The APD controller 216 also determines when to re-encode the video or audio epochs to adapt the bitrate, frame rate, or other characteristic of the video epoch to adapt to network conditions. The APD controller 216 uses two main measurements in determining when to send epochs and when to re-encode epochs. The two main measurements used by the APD controller 216 in managing the transport of the content streams are (1) an estimated network bandwidth of the subnetwork 114 as determined by the delivery interface 236 using bandwidth estimation methods described herein, and (2) an estimate of the temporal amount of an individual content stream stored at the user equipment 116.

To determine the temporal amount of a content stream stored at the user equipment 116, the APD controller 216 keeps track of the duration of the epochs (in seconds of viewing time) that have been delivered via the delivery interface 236. The ADP server 112 also keeps track of the average video rate of the epochs, the estimated network bandwidth being utilized to transport the video, and previous estimates of the temporal amount of content stored at the user equipment 116 by knowing the timestamps of multiplexed audio/video being sent over network.

The APD controller 216 is coupled to a bank of audio encoders 218 and a bank of video encoders 220. A "bank" of video encoders 220 is typically controlled by one APD controller 216 because video encoding is a much more computationally demanding task than the tasks performed by the APD controller 216. Similarly, audio encoding could also require a bank of audio encoders 218. If the APD controller 216 determines that a lower bit rate for the current epoch of video and/or audio is needed, the APD controller 216 triggers the video encoders 220 and/or the audio encoders 218 to re-encode the video stream and/or the audio stream, respectively, at specified bitrates. The APD controller 216 controls the audio encoders 218 and the video encoders 220 to re-encode portions of audio and/or video to maintain client buffers at or above a low buffer limit.

During low bandwidth conditions, it is desirable to reduce the data rate of audio and/or video Streams. The APD Controller 216 can decide, in extremely low network conditions, to re-rate or re-encode the audio from the input audio FIFO 208. In order to achieve audio encoding, the bank of audio encoders 218 is used. The output from the bank of audio encoders 218 is given to the stream multiplexer 228 input queue.

When the video encoders 220 finish re-encoding an epoch of a video stream, the video stream epoch is communicated to an input queue of the video interface 224 of the APD server 112. The video interface 224 also receives epochs that have not been re-encoded from the APD controller 216. The video interface 224 forwards the re-encoded and non-re-encoded epochs to the content stream multiplexer 228. The content stream multiplexer 228 reunites the video epochs received from the video interface 224 with the corresponding audio epochs that were stored in the audio FIFOs 208. The content stream multiplexer 228 creates new containers including synchronized audio and video. The containers can be in, for example, Adobe FLV or Microsoft WMV format. Upon reuniting the audio and video epochs, the content stream multiplexer 228 forwards the containers to the output FIFO buffer 232.

The content stream containers are stored in the output FIFO buffer 232 until the delivery interface 236 retrieves them for delivery to the router and subsequent delivery to the corresponding user equipment 116. The delivery interface 236 is controlled to deliver the content stream epochs as determined by the APD controller 216 to keep the temporal amount of content stream stored in the buffer of the user equipment 116 at a desired level, as discussed above.

Figure 3:
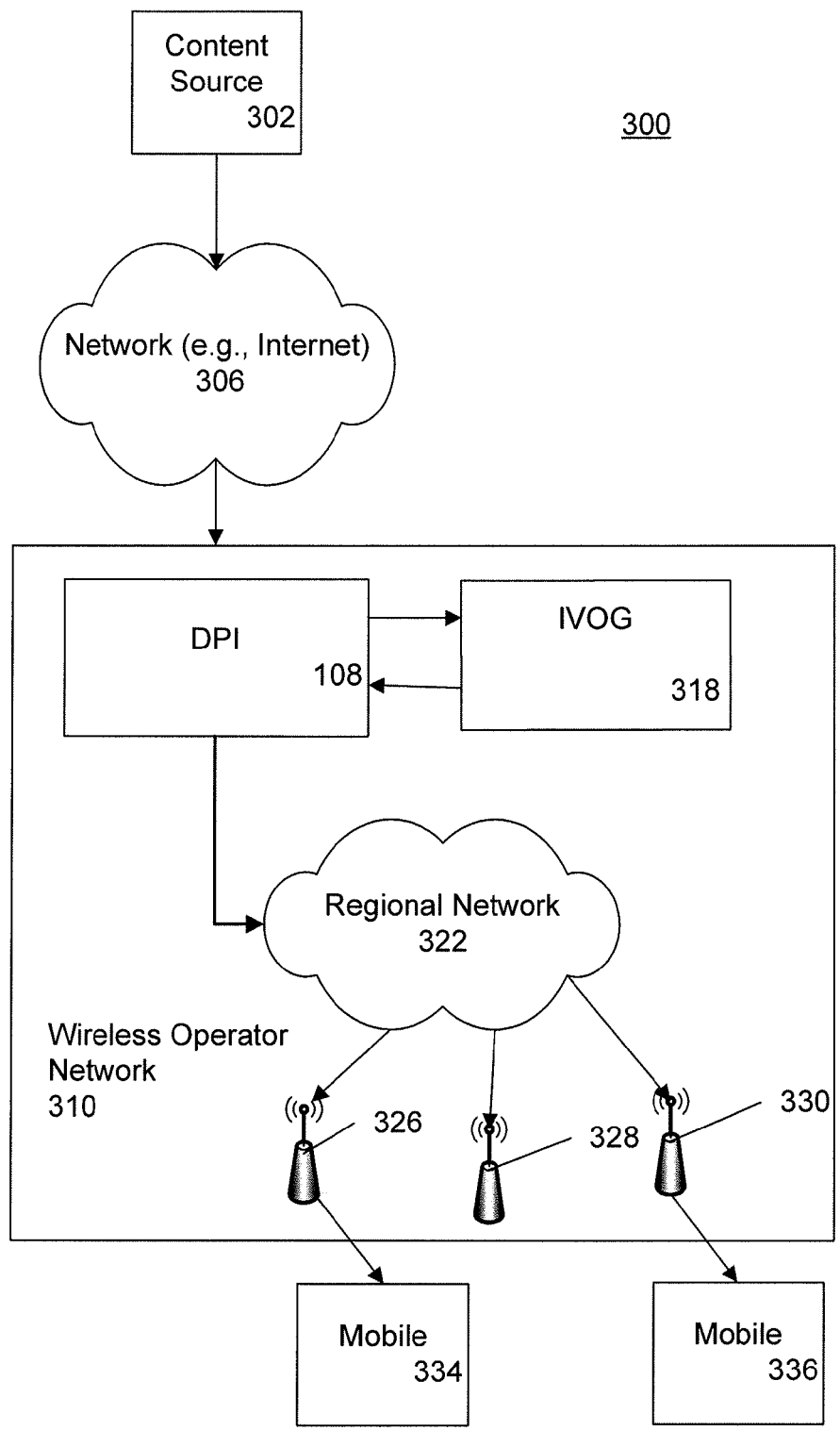
FIG. 3 is a functional block diagram of a system for managing download of streaming data in a wireless operator network.

Referring to FIG. 3, a functional block diagram of a system 300 for managing download of streaming data in a wireless operator network is shown. Wireless networks that can use methods and systems described herein include cellular, WiFi, WiMax, LAN, WAN, satellite, in-flight ISP's that provide video to aircraft and passengers, and others, including wired networks. The system 300 includes a content source 302, a main network 306 and a wireless operator network 310. The main network 306 can be, for example, the Internet. Located at an interface between the main network 306 and the wireless network 310 is one of the DPI routers 108 discussed above. The DPI router 108 controls the flow of data into a regional network 322 of the wireless operator network 310. The DPI router 108 and the regional network 322 can be located in what is referred to as a backbone of the wireless operator network 310. The regional network 322 is coupled to base stations 326, 328 and 330 of the wireless operator network 310. Three base stations 326-330 are illustrated in this example, but more or fewer base stations can be used. The base stations 326, 328 and 330 control the flow of data to mobile devices 334 and 336 that are located in sectors or cells of the base stations 326-330.

The DPI router 108 is coupled to an internet video optimization gateway (IVOG) system 318. The IVOG system 318 includes subsystems such as APD servers 112, and audio and video rate adaptors 218 and 220 discussed above. The DPI router 108 intercepts streamed content and forwards the intercepted data to the IVOG 318 for processing. The APD servers 112 and audio and video rate adaptors 218 and 220 of the IVOG 318 process the data and return the processed data to the DPI router 108 as discussed above in reference to FIG. 2.

Figure 4:
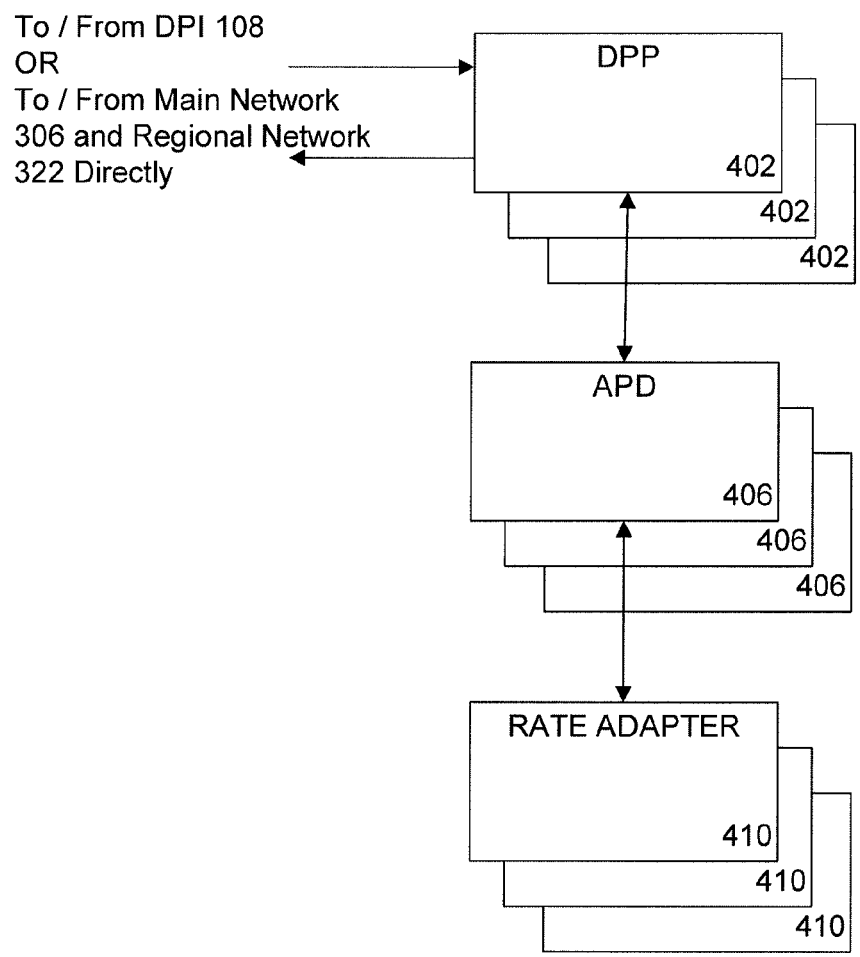
FIG. 4 is a functional block diagram of an illustration of subsystems of a video optimization gateway used in the system of FIG. 3.

FIG. 4 shows a functional block diagram of an illustration of subsystems of the IVOG system 318-1 used in the system 300 of FIG. 3. The IVOG system 318-1 is arranged in a stack with one or more data path processing (DPP) systems 402 on top, one or more APD servers 406 under a DPP system 402, and one or more video/audio rate adapters 410 below the APD servers 406. An example of the DPP system 402 is described in related U.S. patent application Ser. No. 13/466,023 entitled "Data Path Processing" filed May 7, 2012. The DPP system 402 receives data intercepted by the DPI router 108. The DPP system 402 coordinates the processing of content streams to the one or more APD servers 406. The APD servers 406 then coordinate the re-encoding of video/audio and/or other content with the one or more rate adapters 410. Re-encoding of content can include one or more of changing frame rate, changing frame type, increasing and/or decreasing the quantization levels of the content, removing content and adding content.

The APD servers 406 can be configured similarly to the APD server 212 shown in FIG. 2. The rate adapters 410 can include audio and video rate adapters such as the audio rate adapters 218 and the video rate adapters 220 shown in FIG. 2.

The IVOG system 318-1 is illustrated in a divert mode in FIG. 3. In contrast to receiving content streams from the DPI router 108 in the divert mode, as illustrated in FIG. 3, the DPP system 402 can be configured in a bridge mode where all the data goes through the DPP system 402. In the bridge mode, the DPP system 402 communicates data directly to and from both the main network 306 and the regional network 322.

With reference to FIGS. 3 and 4, the DPP system 402 is configured to identify content streams such as multimedia (audio, video and/or text), video streams and/or audio streams that are being communicated from the main network 306 (e.g., from the content source 302) to recipient devices (e.g., the mobile devices 334 and 336). In the case of TCP, a connection between the recipient device and the content source is normally established by an exchange of signaling messages between a respective one of the recipient devices and the content source. When a content stream is identified, the DPP 402 diverts the content stream to one of the APD servers 406.

Figure 5:
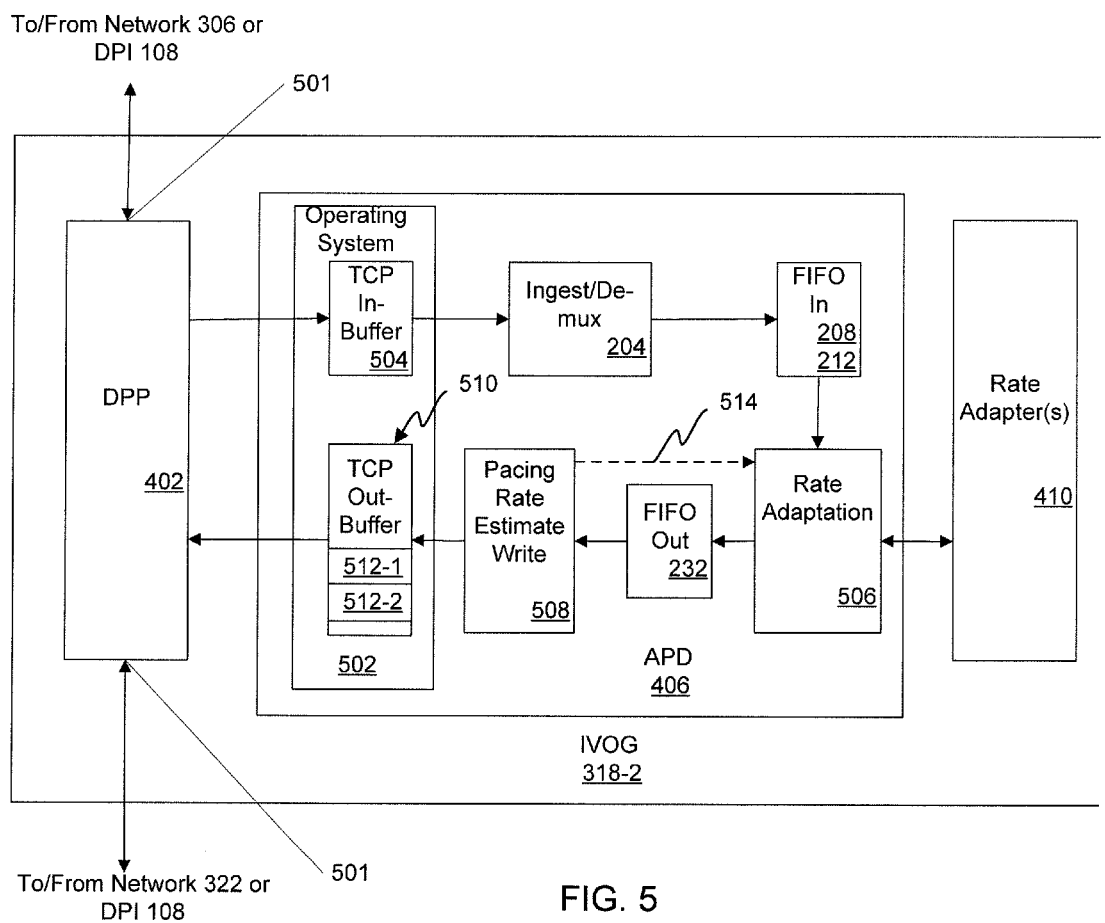
FIG. 5 is a functional block diagram of subsystems of the video optimization gateway of FIG. 4.

FIG. 5 is a is a functional block diagram of subsystems of an IVOG system 318-2. The IVOG system 318-2 includes one DPP system 402, one APD server 406 and one or more rate adapters 410. Other IVOG systems 318 can include more components that those in the IVOG system 318-2. As discussed above in reference to FIG. 3, the DPP 402 can be located between the network 306 (e.g., the Internet) and the regional network 322. The DPP 402 communicates data to and from the networks 306 and 322 (in the bridge mode) or to and from the DPI 108 (in the divert mode) through a respective network interface 501. When the DPP system 402 identifies a content stream of interest, e.g., a TCP stream that can be rate adapted, a TCP ingest buffer 504 in an operating system 502 stores the content data stream. The operating system 502 could be any one of a variety of operating systems such as Windows, Symbian, or another operating system. TCP controls the packet flow of multiple users. Using bandwidth estimation techniques in accordance with the disclosure, the available bandwidth of the lower rate networks at the ends of the network (e.g., the individual cells controlled by the base stations 326, 328, and 330 as shown in FIG. 3) can be estimated.

After content streams are stored in the TCP ingest buffer 504, the ingest/de-mux subsystem 204 receives the content data streams that have been intercepted. The ingest/de-mux subsystem 204 splits the individual content streams into audio and video substreams. The individual audio substreams are stored in corresponding buffers of the audio FIFO buffer 208 and the individual video substreams are stored in corresponding buffers of the video FIFO buffer 212 (audio buffers 208 and video buffers 212 are combined in FIG. 5).

The APD controller 216, the video interface 224, and the content stream multiplexer 228 are contained within a rate adaptation module 506 and perform similar functions as those discussed above in reference to FIG. 2. Content streams that are to be re-encoded are forwarded to the rate adapters 410. The rate adapters 410 can include the audio rate adapters 218 and the video rate adapters 220. The re-encoded video/audio streams, and the non-re-encoded video/audio streams are stored in the FIFO buffer 232. The pacing rate estimate write module 508 is part of, or used instead of, the delivery interface 236 of FIG. 2. The rate adaptation module 506 determines whether or not to re-encode video and/or audio streams based on a bandwidth estimate 514 received from a pacing rated estimate write module 508. The rate adaptation module 506 determines whether or not to re-encode content streams periodically, e.g., every one second, every two seconds, every three seconds or more. The determination to re-encode is based on the bandwidth estimate 514 as well as an estimate of the amount of data estimated to be stored in the client buffers, as was discussed above in reference to FIG. 2.

The pacing rate estimate write module 508 (referred to from herein as the write module 508) retrieves blocks of data from individual content streams that are to be transmitted over the networks 306 and/or 322 from the FIFO buffer 232. The size of the pulse data is related to the rate of the stream that is being streamed. The pulse data is simply a byte stream, and is not necessarily aligned to any particular container boundary. For typical video, the range of data rates covers a range on an order of about 2.5 or three times from the lowest data rates to the highest data rates. For example, complex scenes typically take about 2.5 times the bandwidth of simple scenes. For this reason, the write module 508 typically sends about three or four times the lowest bandwidth of a video in a single data block, but the write module 508 sends blocks of data about ¼ as often. For example, the write module 508 may transmit about two seconds of media data, in a 100 msec. time period, depending on the bandwidth. If the data is completely sent out faster than the media duration, the write module 508 estimates the capacity of the channel, and then the write module 508 can (1) adjust the block size to take up a portion of the excess capacity, or (2) the rate change module 506 can transrate the video to take up less capacity if the estimated bandwidth of the channel is insufficient to support the non-re-encoded video data rate.

The bandwidth estimator of the write module 508 can be implemented as a user-space process, or a thread within a user space process. The user space process can be, for example, a process in the Linux operating system. The user-space process is above the kernel level. The kernel level contains the TCP functions. User space processes and threads are simple and do not require modification of the kernel layer.

Upon retrieving the block of data for an individual content stream from the FIFO buffer 232, the write module 508 writes the chunk of data to a TCP out-buffer 510. The TCP out buffer 510 is part of the TCP stack in the application layer. The TCP out buffer 510 includes multiple inelastic buffers 512. Two buffers 512-1 and 512-2 are shown, but there can be more buffers 512, one for each content stream being transmitted out of the IVOG 318-2. Often times the buffers used for TCP are elastic, but the IVOG system 318-2 utilizes fixed or inelastic out-buffers 512.

The individual out-buffers 512 are small enough such that the chunks of data being written to the out buffers 512 by the write module 508 will fill up the individual out-buffers 512. For example, the chunks of data can be about ten times as large as the individual out-buffers 512. The TCP application controls the transmission and re-transmission of data out of the individual out-buffers 512 based on feedback from the downstream networks 306 and/or 322. The data in the individual out-buffers 512 is communicated to the DPP 402 to be transmitted to the client device using a normal protocol such as TCP.

As a non-limiting example, if the average data rate that is being transmitted in one content stream is about 1 Mbps (125 KBps)., then the out-buffer 512 should hold about 32 kbytes of data, and in order to transmit a 2 second pulse of data the buffer will be filled and emptied 8 times. The total time for the complete write of the data pulse is used for the network bandwidth estimate. Sizing the buffer to 32K allows efficient transport of content rates from 100 Kbps to 2 Mbps. Significantly lower content rates may be better suited to a smaller buffer. The out-buffer 512 fills up before the write completes, but the write still keeps writing to the buffer. The write module 508 is simply doing block-writes to the out-buffers 512 in the TCP stack. Since an individual out-buffer 512 fills up, the write module 508 just keeps writing. As long as the write module is writing faster than the individual out-buffer 512 is being emptied, the write module can determine how long it takes to completely write the entire chunk of data. The internal dynamics of the TCP application controls the emptying of the individual out-buffers 512.

Knowing the time to complete the writing of the chunk of data, and knowing the size of the pulse data chunk, the write module 508 computes the estimated bandwidth 514 by dividing the data chunk size by the time to complete the block write operation. The block write operation is a conventional TCP feature. The block write operation doesn't complete until the entire data block has been sent. A socket library of the operating system 502 provides a completion signal to the write module 508 when the block write operation has completed writing the data block to the out-buffer 512. Upon completion of writing a data block, the write module 508 determines the estimated bandwidth 514 and communicates the determined bandwidth 514 to the rate adaptation module 506 such that the rate adaptation module 506 can determine whether or not to re-encode the associated content stream.

If, while writing a data chunk to one of the individual output buffers 512, the time to transmit the data chunk exceeds a threshold amount of time (e.g., a fraction of the display time of the data chunk), the write module 508 stops writing data from the data chunk to the individual out-buffers 512 and the write module 508 makes an estimate of the bandwidth based on how much of the data chunk has been written in the threshold amount of time. The write module 508 can use a running average of a number of previous computed bandwidths to compute the bandwidth.

Another limiting factor that determines the size of the data chunks written to the individual out-buffers 512 is the size of the buffers in the TCP channel. There are buffers upon buffers in the TCP stack going to the destination device. The individual out-buffers 512 are large enough and being written to fast enough by the write module 508, such that the buffers in the TCP stack are being written to faster than the out-buffers 512 are being emptied. The estimated bandwidth does not need to be an accurate indication of data rates that are much larger than the data rate of the content being supplied. In other words, if the write module 508 is able to estimate bandwidths about 10 times greater than the average data rate of the content stream, then this is sufficient for present wireless network conditions. It is not necessary in most circumstances to be able to measure bandwidths that are more than 10 times the data rate of the content being written to the individual out buffers 512. It is more important t be able to detect when the bandwidth of the channel is getting too small for their desired content data rate.

Figure 6:
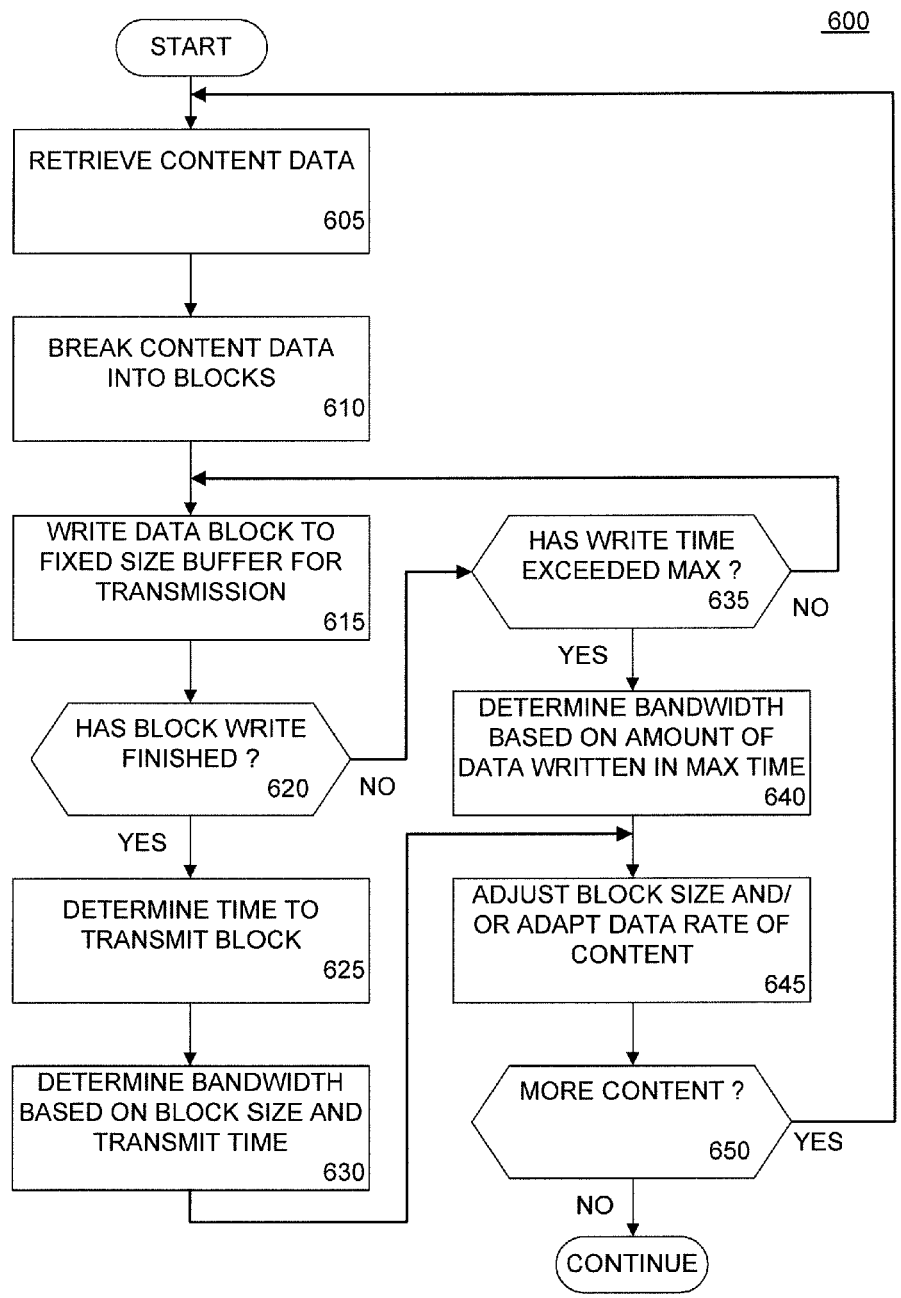
FIG. 6 is a flow diagram of operations performed by the video optimization gateway of FIG. 4.

FIG. 6 is a flow diagram of operations performed in a process 600 by the video optimization gateway 318-2 of FIG. 5. With reference to FIGS. 5 and 6, the process 600 starts at step 605 where the write module 508 retrieves content data from the FIFO buffer 232. The FIFO buffer 232 contains multiple re-encoded and non-re-encoded content streams that have been processed by the rate adaptation engine 506. The multiple content streams are identified by content stream identification numbers, frame number, etc. At block 610, the writing module 508 breaks individual content streams into data blocks to be written to the individual out-buffers 512 and transmitted to the receiving devices via the DPP system 402. The size of the content blocks is determined by (1) the amount of content buffered at the client devices, and (2) by the estimated bandwidth of the transmit channel. Usually, each block will contain 1, 2, 3 or more epochs of content, where each epoch is decodable independently from other epochs. The rate adaptation module 506 provides epochs re-encoded to be compatible with past bandwidth estimates 514 that the write module 508 has communicated to the rate adaptation module 506.

Upon breaking the content stream(s) into block(s) at step 610, the process 600 continues at step 615 where the writing module 508 performs block writes of the data blocks to the individual out-buffers 512 in the TCP out-buffer 510. The data blocks are written to the out-buffers as fast as the operating system 502 allows such that the out-buffers 512 fill up while the TCP application controls transmission and re-transmission of data packets over the networks 306 and/or 322. At decision block 620, the writing module 508 determines whether or not a data block has finished being transmitted to the receiving device. If the data block has finished transmission, the process 600 proceeds to block 625, where the writing module 508 determines the amount of time that was needed to transmit the data block.

Upon determining the transmit time, the writing module determines an estimated bandwidth at step 630 by dividing the known size of the data block by the transmit time. Video data rate and channel bandwidth can vary significantly over time. The bandwidth determination at step 630 can include time-averaging (e.g., low-pass filtering) of a number of previous bandwidth estimates in order to smooth out sporadic changes in data rate and/or bandwidth.

If it is determined at step 620 that the data block is not finished being transmitted, the process 600 continues at block 635 where the writing module 508 determines if a maximum threshold transmission time for the data block has been exceeded. The maximum transmission time threshold can be a function of the display time of the data block. For example, if four seconds of video are contained in a data block, the maximum transmission threshold could be set to two, three or four seconds. If the maximum transmission threshold has been exceeded, the writing module temporarily stops and determines the estimated bandwidth at step 640 based on the amount of the data block that was transmitted and the maximum transmission threshold time. After the network bandwidth estimation update, the remaining bytes of the pulse are sent in the next pulse. If the maximum transmission threshold is determined not to be exceeded for the current data block at decision block 635, the process repeats steps 615, 620 and 635.

After the writing module 508 has determined the estimated bandwidth, either at step 630 or step 640, the process continues at step 645 where the writing module adjusts a size of a subsequent data block and/or the rate adaptation module 506 re-encodes subsequent epochs of video and/or audio to be compatible with the determined bandwidth estimate. At block 650, the writing module 508 determines if more content remains in a content stream to be transmitted. If more content exists, the steps 605, 610, 615, 620, 625, 630, 635, 640, 645, and 650 are repeated. If no more content exists in a present content stream, the process 600 terminates for the current content stream and continues for other content streams that have content to be transmitted.

Figure 7:
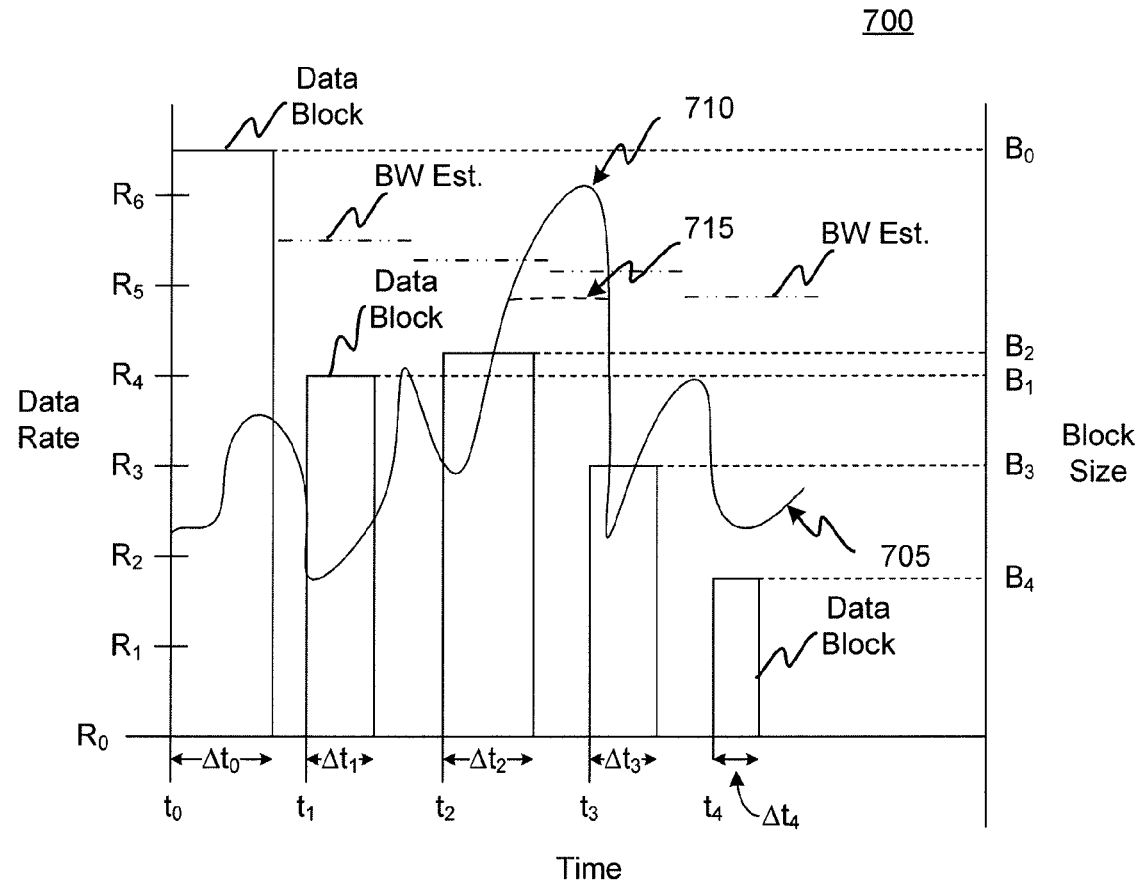
FIG. 7 illustrates an example time history for pacing the writing of a content stream using the disclosed process.

FIG. 7 illustrates an example time history 700 for pacing the writing of a content stream using the process 600. The time history 700 includes a content stream data rate time history 705 that varies over time. The data rate time history 705 represents changing encoded data rates of video where low complexity video requires a small data rate and more complex video requires a higher data rate. The video data rate time history 705 varies in a range between Ro to about $R_6$. At time $t_0$, a first data block of size $B_0$ is written to one of the out-buffers 512 by the writing module 508. Typically, the first data block of a content stream will be larger than subsequent data blocks in order to quickly build up the amount of content contained in the receiving device buffers for playback. For example, the first data block of size $B_0$ could contain ten to fifteen seconds of playback time.

The first data block takes a time $\Delta t_0$ to finish transmitting to the receiving device. Subsequent to the transmission of the first data block, the writing module 508 determines an estimated bandwidth by dividing the data block size $B_0$ by the time $\Delta t_0$. The estimated channel bandwidth is illustrated by the dashed line labeled BW Est. The first BW Est. is between a data rate of $R_5$ and $R_6$. The writing module 508 determines subsequent data block sizes B1, B2, B3 and B4 based on the estimated bandwidth and/or based on the amount playback time contained in the receiving device buffers (not illustrated in FIG. 7).

The time history 700 illustrates a situation where the rate adaptation module 506 determines a need to re-encode the content stream at a lower data rate. A spike in the data rate time history 705 is shown by reference numeral 710. The data rate spike 705 is greater than the estimated bandwidth of the channel (illustrated by the dashed lines labeled BW Est.). Because the content data rate is greater than the estimated channel bandwidth, the rate adaption module 506 determines to re-encode the content at a lower date rate 715 of about R5 which is lower than the channel bandwidth estimate BW Est. When the content data rate falls below the channel bandwidth estimate at about time $t_3$, the rate adaptation module 506 stops re-encoding the content. The time history 700 of FIG. 7 is not drawn to scale and is used here for illustrative purposes only.

The time between the start of the transmission of data blocks is fairly periodic (about every 6 seconds), but it can vary somewhat due to re-encoding delays and the length of time to transmit the data blocks. When the available channel bandwidth is dropping, the time between transmission of data blocks basically disappears while the content is being re-encoded at lower data rates.

In one embodiment, a computer system (such as the IVOG systems 318 of FIGS. 3, 4 and 5) is used to perform methods as described herein. According to a set of embodiments, some or all of the procedures of such methods are performed by the computer system in response to a processor of the system executing one or more sequences of one or more instructions (which might be incorporated into the operating system and/or other code of the computer system, such as an application program) contained in working memory of the computer system. Such instructions may be read into the working memory from a machine-readable medium, such as one or more storage devices. Merely by way of example, execution of the sequences of instructions contained in the working memory might cause the IVOG system 318-2 to perform one or more procedures of the methods described herein.

The terms "machine readable medium" and "computer readable medium," as used herein, refer to any medium that participates in providing data that causes a machine to operate in a specific fashion. In an embodiment implemented using the IVOG system 318, various machine-readable media might be involved in providing instructions/code to processors for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as storage devices. Volatile media includes, without limitation, dynamic memory, such as the working memory. Transmission media includes coaxial cables, copper wire, and fiber optics, including the wires that comprise a system bus of the IVOG system 318, as well as various components of subsystems such as a communications subsystem or network delivery interface (and/or the media by which the communications subsystem provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the computer processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by the IVOG system 318. These signals, which might be in the form of electromagnetic signals, acoustic signals, optical signals, and/or the like, are all examples of carrier waves on which instructions can be encoded, in accordance with various embodiments of the invention.

The present invention has been described above in terms of presently preferred embodiments so that an understanding of the present invention can be conveyed. There are, however, many configurations of systems for managing the delivery of progressively downloaded video data not specifically described herein but with which the present invention is applicable. The present invention should therefore not be seen as limited to the particular embodiments described herein, but rather, it should be understood that the present invention has wide applicability with respect to video data delivery systems generally. All modifications, variations, or equivalent arrangements and implementations that are within the scope of the attached claims should therefore be considered within the scope of the invention.

We claim:

1. A method of streaming video data from a content source over a network to a client device, the method comprising:

performing Deep Packet Inspection (DPI) analysis of traffic data that is transferred on a network route from (i) the content source to (ii) a regional wireless network to which the client device is wirelessly connected;

based on the DPI analysis, determining that a portion of the traffic data is streaming video data, and redirecting the streaming video data to an Adaptive Progressive Download (APD) server which is connected in said network route between (i) the content source and (ii) the regional wireless network to which the client device is wirelessly connected;

at said APD server which is connected in said network route, performing:

(a) creating a fixed-size Transmission Control Protocol (TCP) out-buffer in a TCP stack of a TCP application layer running on said APD server;

(b) preparing a first data-block of the streaming video data, wherein the first data-block has a size which is greater than a size of the fixed-size TCP out-buffer;

(c) writing the first data-block of the streaming video data, into the fixed-size TCP out-buffer of the TCP stack in the TCP application layer on said APD server;

(d) while said first data-block of streaming video data is still being written into the fixed-size TCP out-buffer of the APD server, continuously releasing content from the fixed-size TCP out-buffer, by said TCP application of the APD server to a downstream directed to the client device;

(e) upon completion of the writing of the data-block of streaming video data, into the fixed-sized TCP out-buffer of the APD server, signaling within the APD server by a write completion signal of a socket library of an operating system running on said APD server;

(f) computing at said APD server an estimate of the bandwidth of said downstream, without receiving feedback from the client device, wherein the data-block to the fixed-sized TCP out-buffer, by (B) the size of the data-block written to the fixed-size TCP out-buffer.

2. The method of claim 1, further comprising:
determining a bit rate at which to re-encode a second data-block of the streaming video data, based on the estimated bandwidth of said downstream.

3. The method of claim 1, further comprising:
determining that a transmit time to send the first data-block of streaming video data has exceeded a threshold time; and
estimating the bandwidth of said downstream based on an (A) an amount of the first data-block that has been transmitted and (B) the threshold time.

4. The method of claim 1, comprising:
at the Adaptive Progressive Download (APD) server, which is connected along the network route between (i) the content source and (ii) the regional wireless network to which the client device is wirelessly connected, performing:
(a) de-multiplexing the streaming video data into multiple video epochs, wherein each video epoch begins with an intra-coded frame (I-Frame) to enable each video epoch to be decoded independently of other video epochs;
(b) based on said estimate of the bandwidth of said downstream, determining that a current video epoch requires re-encoding at a lower bitrate;
(c) re-encoding the current video epoch at the lower bitrate;
(d) multiplexing the re-encoded current video epoch and other video epochs to generate an output content stream.

5. The method of claim 1, comprising:
at the Adaptive Progressive Download (APD) server, which is connected along the network route between (i) the content source and (ii) the regional wireless network to which the client device is wirelessly connected, performing:
(a) de-multiplexing the streaming video data into multiple video epochs, wherein each video epoch begins with an intra-coded frame (I-Frame) to enable each video epoch to be decoded independently of other video epochs;
(b) based on said estimate of the bandwidth of said downstream, determining that a current video epoch requires re-encoding at a lower bitrate;
(c) re-encoding the current video epoch at the lower bitrate;
(d) multiplexing (A) the re-encoded current video epoch, and (B) other non-re-encoded video epochs, to generate an output content stream.

6. The method of claim 5, wherein re-encoding the current video epoch comprises:
changing a frame rate of the current video epoch.

7. The method of claim 5, wherein re-encoding the current video epoch comprises:

changing a frame type of the current video epoch, wherein the frame type is selected from the group consisting of: I-Frame, P-Frame, B-Frame.

8. The method of claim 5, wherein re-encoding the current video epoch comprises:
changing a quantization level of the current video epoch.

9. The method of claim 1, wherein computing at said APD server the estimate of the bandwidth of said downstream, comprises:
computing at said APD server the estimate of the bandwidth of a downstream between (a) the APD server, and (b) said regional wireless network to which multiple client devices are wirelessly connected.

10. A system for streaming video data front a content source over a network to a client device, the system comprising:
a Deep Packet Inspection (DPI) module to intercept traffic data being transferred over a network route from (i) the content source to (ii) a regional wireless network to which the client device is wirelessly connected;
an Adaptive Progressive Download (APD) server associated with said DPI module and connected on said network route from (i) the content source to (ii) the regional wireless network to which the client device wirelessly connected;
wherein the DPI module is (A) to determine that a portion of the traffic data is streaming video data, and (B) to redirect the streaming video data to the ADP server;
wherein the APD server which is connected in said network route is:
(a) to create a fixed-size Transmission Control Protocol (TCP) out-buffer in a TCP stack of a TCP application layer running on said APD server;
(b) to prepare a first data-block of the streaming video data, wherein the first data-block has a size which is greater than a size of the fixed-size TCP out-buffer;
(c) to write the first data-block of the streaming video data, into the fixed-size TCP out-buffer of the TCP stack in the TCP application layer running on said APD server;
(d) while said first data-block of streaming video data is still being written into the fixed-size TCP out-buffer of the APD server, to continuously release content from the fixed-sized TCP out-buffer, by said TCP application of the APD server to a downstream directed to the client device;
(e) upon completion of the writing of the data-block of streaming video data, into the fixed-sized TCP out-buffer of the APD server, to signal within the APD server by a write completion signal of a socket library of an operating system running on said APD server;
(f) to compute at said APD server an estimate of the bandwidth of said downstream, without receiving feedback from the client device, by diving (A) a time period required to complete the writing of the data-block to the fixed-size TCP out-buffer, by (B) the size of the data-block written to the fixed-size TCP out-buffer.

11. The system of claim 10, wherein the second portion of data is encoded at an encoded bit rate, and the processor is further configured to determine a bit rate at which to re-encode the second portion based on the determined second presentation time and the determined metric.

12. The system of claim 10, wherein the processor is to determine that the first transmit time to send the first portion has exceeded a threshold time, wherein the processor determines the metric of the bandwidth capacity based on an amount of the first portion that has been transmitted and the threshold time.

\* \* \* \* \*

UNITED STATES PATENT AND TRADEMARK OFFICE
CERTIFICATE OF CORRECTION

PATENT NO. : 8,788,695 B2
APPLICATION NO. : 13/525069
DATED : July 22, 2014
INVENTOR(S) : Michael Fox et al.

Page 1 of 1

It is certified that error appears in the above-identified patent and that said Letters Patent is hereby corrected as shown below:

In the Claims

Claim 1, Column 15, lines 16-18, the phrase "wherein the data-block to the fixed-sized TCP out-buffer, by (B) the size of the data-block written to the fixed-size TCP out-buffer" is replaced with the phrase: "wherein the computing comprises: dividing (A) a time period required to complete the writing of the data-block to the fixed size TCP out-buffer, by (B) the size of the data-block written to the fixed-size TCP out-buffer."

Signed and Sealed this
Thirtieth Day of September, 2014

Michelle K. Lee
*Deputy Director of the United States Patent and Trademark Office*